Figure 4:
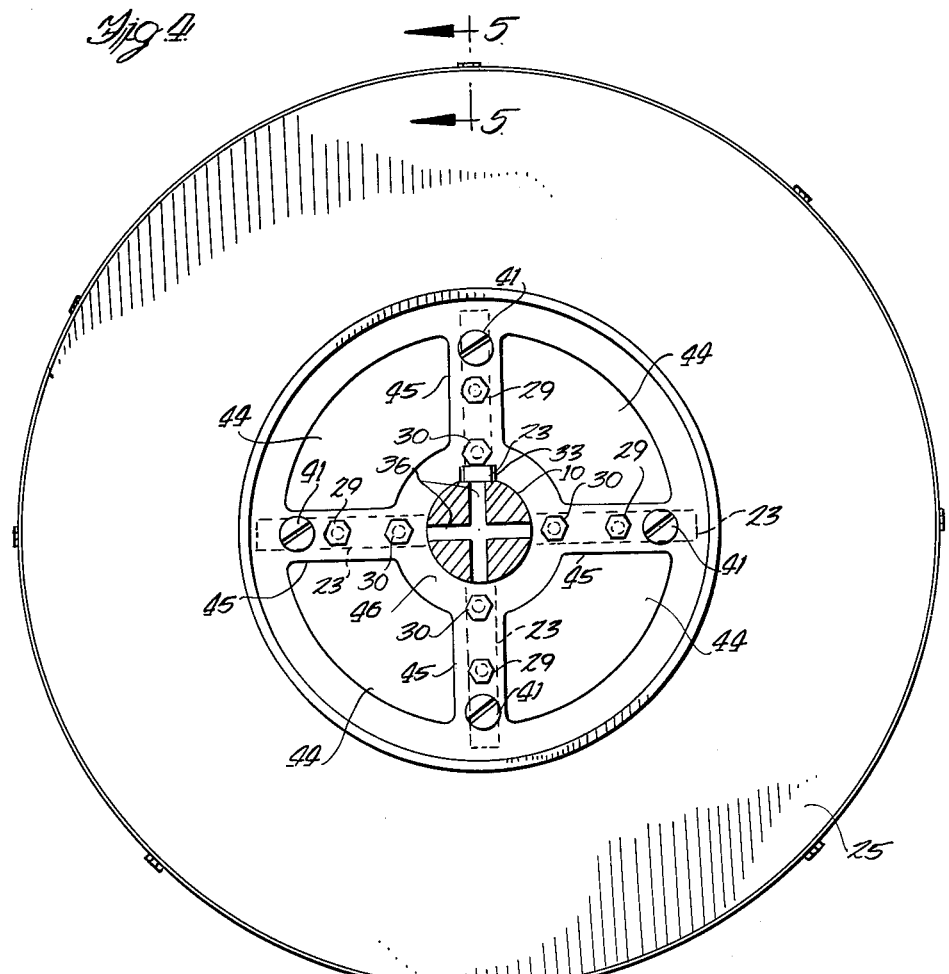

Feb. 8, 1966 W. J. PODBIELNIAK 3,233,880
CONTINUOUS CENTRIFUGAL VAPOR-LIQUID CONTACTOR
Filed Aug. 3, 1962 4 Sheets-Sheet 1
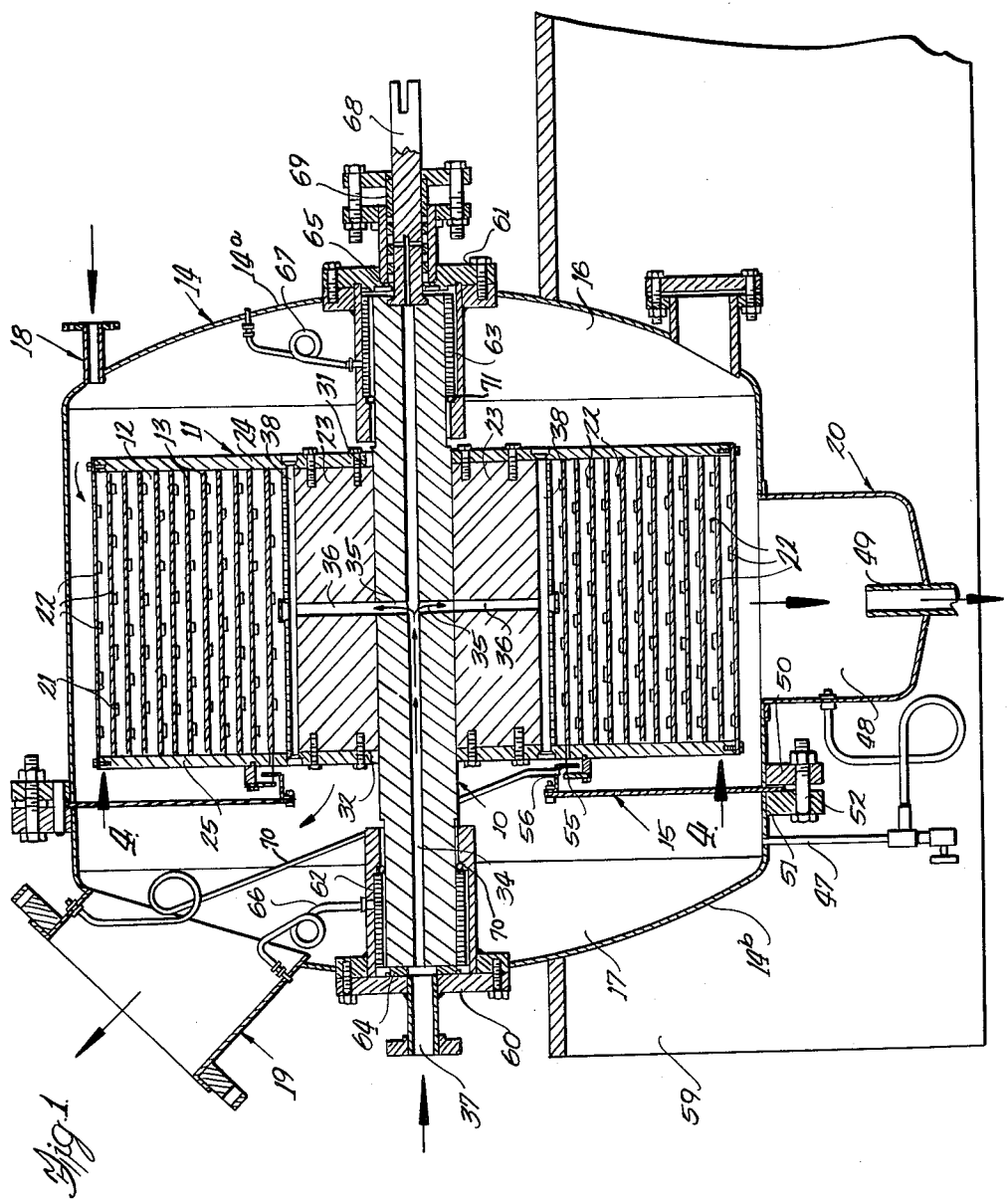

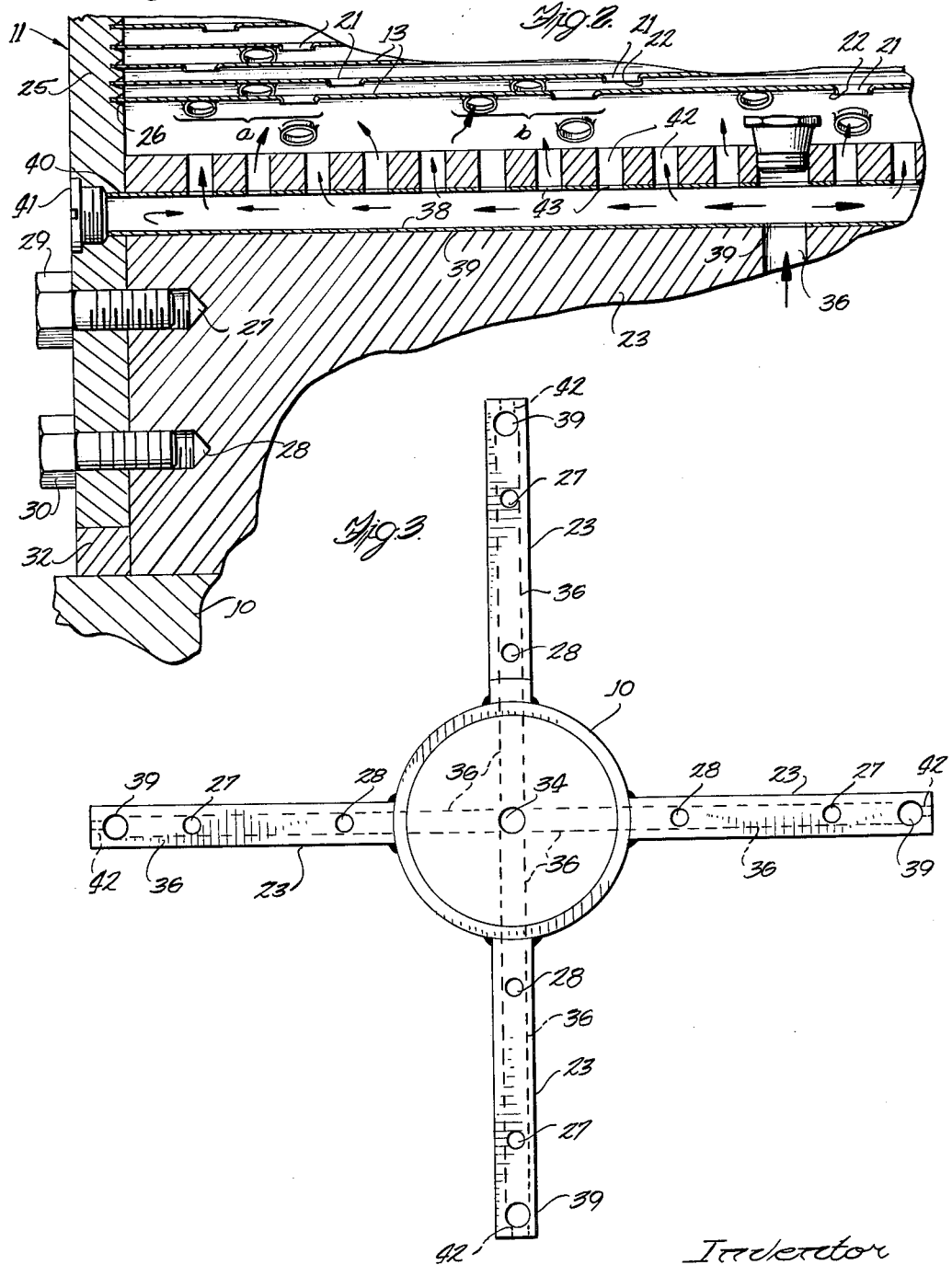

Feb. 8, 1966   W. J. PODBIELNIAK   3,233,880
CONTINUOUS CENTRIFUGAL VAPOR-LIQUID CONTACTOR
Filed Aug. 3, 1962   4 Sheets-Sheet 3

Inventor
Walter J. Podbielniak
Dawson, Tilton, Fallon,
Lungmus & Alexander
Attorneys Feb. 8, 1966    W. J. PODBIELNIAK    3,233,880
CONTINUOUS CENTRIFUGAL VAPOR-LIQUID CONTACTOR
Filed Aug. 3, 1962    4 Sheets-Sheet 4
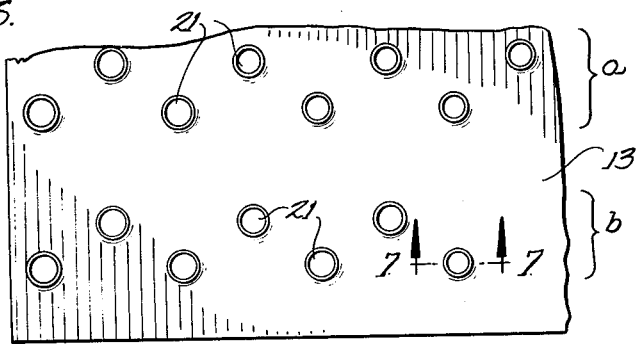
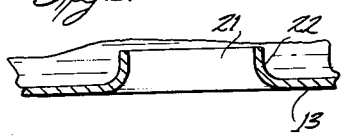
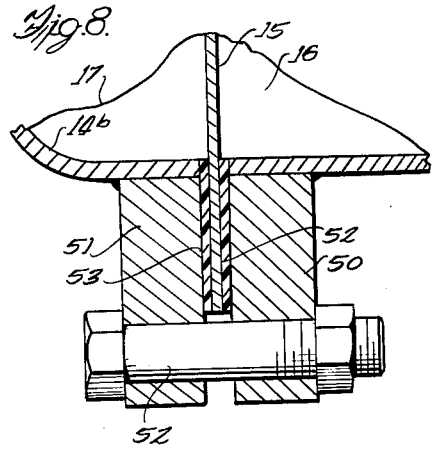
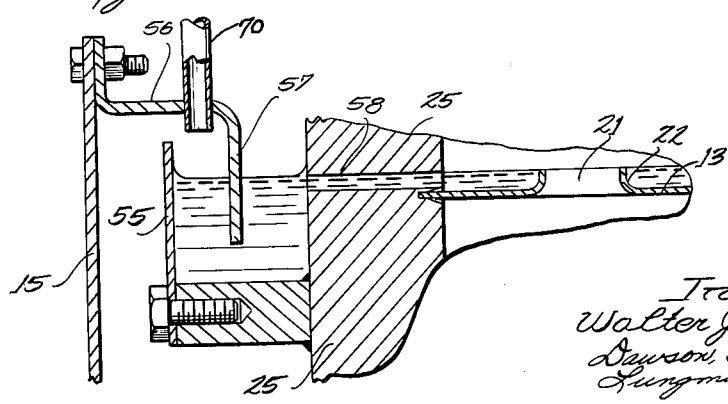

United States Patent Office 3,233,880
Patented Feb. 8, 1966

3,233,880
CONTINUOUS CENTRIFUGAL VAPOR-LIQUID CONTACTOR
Walter J. Podbielniak, Chicago, Ill., assignor to Dresser Industries, Inc., Dallas, Tex., a corporation of Delaware
Filed Aug. 3, 1962, Ser. No. 214,564
5 Claims. (Cl. 261—83)

This invention relates to a continuous centrifugal vapor-liquid contactor. The contactor has particular utility as a deodorizer wherein a triglyceride oil or fat is continuously contacted with steam while applying centrifugal force thereto. The apparatus of this invention and certain features thereof also have utility for the continuous countercurrent contacting of other liquids and gases.

Triglyceride fats and oils of animal and vegetable origins, such as lard, soybean oil, cotton seed oil, corn oil, and the like, in being processed to improve their palatability are subjected to a procedure known as deodorization. In this procedure the fat or oil is treated with steam under high vacuum to remove trace quantities of objectionable odor and flavor substances, thereby, producing a bland, odorless product of the kind required by the industry for the manufacture of salad oils, shortenings, and margarine. Present day processing plants conduct deodorization operations at temperatures between 400–500° F. and at absolute pressures of 1 to 6 mm. Hg. This combination of elevated temperature and high vacuum creates a number of problems which complicate the design of efficient and economical deodorization equipment.

Since the amount of material to be removed by deodorization is minute (0.1 to 0.2%), and the steam must be employed in very large volume relative to the fat or oil, entrainment loss of the valuable triglyceride material is difficult to avoid. In other words, the steam which is used to strip-out the trace quantities of free fatty acid and other volatile odor and flavor bodies, tends to remove some of the fat or oil as fine particles or droplets. This entrainment loss problem is particularly acute with continuous deodorization apparatus which otherwise should be the most efficient type of equipment for this operation. It has been estimated that as much as 30 to 40% of the cost of a continuous deodorization operation is due to product loss during the deodorization.

As previously stated, valuable triglyceride material is unintentionally removed by the steam due to entrainment. The contacting of the steam with the triglycerides at the high temperatures involved also causes another kind of oil loss. This is due to hydrolysis or partial hydrolysis of the triglycerides to free fatty acids. The fatty acids thus formed are removed with the steam as a volatile component. Such hydrolysis loss is directly related to contact time and temperature. It can be reduced by operating at lower temperatures (e.g. 400–425° F.), but this requires the use of lower absolute pressures and more efficient steam stripping. At the preferred temperatures of 450 to 475° F., it is desirable to have as short a contact time as possible while still achieving acceptable deodorization.

It is therefore an object of the present invention to provide a deodorizer apparatus which reduces product loss due to entrainment and/or hydrolysis. A more specific object is to provide continuous deodorization apparatus which incorporates means for separating the entrained triglyceride material before the steam is discharged from the deodorization apparatus. A further specific object is to provide apparatus of the character described which permits the contact time between the steam and triglyceride material to be reduced, thereby permitting the deodorization to be carried out at higher temperatures without significant hydrolysis loss. A further object is to provide deodorization apparatus which provides for more efficient contacting of the steam with the fat or oil. Another object is to provide deodorization apparatus which achieves the advantage of greater compactness. More generally, it is an object to provide a vapor-liquid contact apparatus having novel design features which can advantageously be applied to a wide variety of vapor-liquid contacting operations. Further objects and advantages will be indicated in the following detailed specification.

Figure 5:
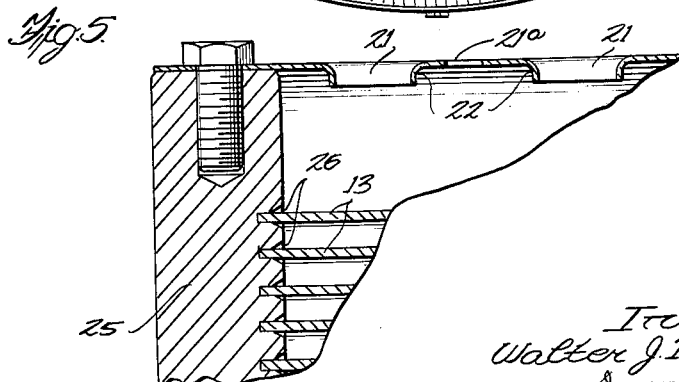

The present invention is shown in an illustrative embodiment in the accompanying drawings, in which:

FIG. 1 is a sectional side elevational view of an apparatus embodying the features of the present invention;

FIG. 2, a fragmentary enlarged detailed view taken on the same section as FIG. 1 and showing part of the liquid feed arrangement;

FIG. 3, an end view of the shaft and anchor plate components of the apparatus;

FIG. 4, an end view of the assembled rotor, the shaft being shown in section, the section being taken through the liquid inlet passages;

FIG. 5, an enlarged fragmentary sectional view of part of the rotor, taken on line 5—5 of FIG. 4;

FIG. 6, a partial plan view of one of the metal sheets from which the rotor rings are formed, showing the layout of the openings;

FIG. 7, a detailed sectional view of one of the openings through the ring sheet of FIG. 6, taken on line 7—7 of that figure;

FIG. 8, an enlarged sectional detail view taken on the same section as FIG. 1 showing the support of the partition and the connection of the vessel cover; and, FIG. 9, an enlarged sectional detail view taken on the same section as FIG. 1 and showing the liquid seal arrangement.

Looking first at FIG. 1, there is shown a novel apparatus for the countercurrent contacting of a liquid and a gas, such as steam and a triglyceride oil, while applying centrifugal force thereto. The apparatus includes a rotatably-supported shaft 10, and a cylindrical rotor 11 mounted coaxially on shaft 10 for rotation therewith. Preferably, shaft 10 and rotor 11 are supported for rotation about a horizontally-extending axis, as in the illustration of FIG. 1. The rotor 11 provides a contacting chamber 12 containing contacting elements 13 which provide radially-spaced walls having openings therethrough to permit gas to flow inwardly through rotor 11 while liquid flows outwardly.

In accordance with the present invention, there is provided a stationary casing 14 which encloses rotor 11 and the portion of shaft 10 on which the rotor is mounted. Preferably, casing 14 is in the form of a pressure-tight vessel which permits a pressure substantially lower (or higher) than atmospheric to be maintained within the interior of the vessel. There is also provided a partition means 15 which divides the interior of vessel 14 into two axially spaced zones 16 and 17. In the embodiment of FIG. 1 the partition means 15 is in the form of a vertically extending disc, but other means can be employed. Rotor 11 is disposed within zone 16, and a gas or steam inlet means 18 is provided for supplying the gas to be contacted to the rotor zone 16 for passage from the outer portion of rotor 11 to the inner portion thereof. In the embodiment shown inlet 18 is of relatively small size, being designed for the introduction of steam. For other gases where it is desired to minimize pressure drop at the inlet, means 18 can be employed. The rotor diameter can vary from 16 to 60 inches, although a diameter of about 40 to 50 inches is particularly desirable.

A gas or steam outlet means 19 communicates with the interior of chamber 17 for removing gas therefrom. The rotor 11 provides gas or steam discharge means, which will subsequently be described in detail, that extends from the inner portion of the rotor into steam exhaust chamber 17, as indicated by the arrows in FIG. 1. There is also provided a liquid or oil inlet means for supplying the liquid to be contacted to the interior of rotor 11. One form of liquid inlet means will also be subsequently described. The flow of the incoming liquid is also indicated by arrows in FIG. 1. There is also provided a liquid or oil outlet means 20 for removing liquid from chamber 16 after the liquid has passed through rotor 11.

In the embodiment of FIG. 1, the radially spaced walls 13 of the contacting element means are provided by a plurality of axially-concentric rings or cylinders supported within rotor 11 and extending thereacross. Walls 13 can also be provided by spiral elements as described in Patent 2,286,157. As shown in FIG. 2, the rings 13 provide openings 21 which are dimensioned for countercurrent flow of liquid and gas through the same openings. For example, openings 21 can range from 1/8 inch to 2 inches in diameter. For the deodorization of a triglyceride material with steam, it is preferred to have openings 21 range from 3/4 inch to 1½ inches in diameter, thereby avoiding any substantial steam pressure drop across the openings. The openings 21 can be arranged in various ways, but they are preferably distributed on rings 13 in axially and circumferentially spaced relation. That is, the perforations extend across the rings as well as around the circumference thereof. It is also preferred to position the openings in adjacent rings so that they are radially offset with respect to each other. In other words, a radial line extending perpendicularly to the axis of shaft 10 should not extend through openings in adjacent rings since this might tend to promote channeling of the liquid and/or gas flows. In general, channeling tends to interfere with contact and stage efficiency, although in some applications some degree of channeling can be tolerated to obtain increased capacities or for other reasons. The offset or staggered relations of the openings 14 can be seen in FIG. 2.

In FIG. 6, there is shown a portion of a metal sheet from which one of the rings 13 can be formed, the flat sheet being rolled into a cylinder and the abutting ends of the sheet united by welding. As there shown, the openings 21 are arranged in spaced bands or zones, such as band $a$ and $b$. In the illustration given, the bands each include two rows of the openings 21, and all of the rows extend in generally parallel alignment. While the rows of openings can extend across the band 13 in axial alignment, or circumferentially around the bands, it is preferred to have the rows of the openings extend circumferentially around the bands. For example, in the showing of FIG. 6 this would be accomplished by rolling the sheet from left to right. This arrangement is also indicated in FIG. 2, where the bands $a$ and $b$ are indicated. It will be understood that the bands will be repeated a sufficient number of times to extend entirely across the rings 13.

When the apparatus of the present invention is employed for the steam deodorization of vegetable oils and fats, it is preferred to provide inwardly-projecting circumferentially-extending baffles around the inside of ring openings 21. The baffles are designed to cooperate with rings 13 so that the liquid such as a vegetable oil, on the inside surface of the ring flows over the inwardly-projecting ends of the baffles to enter and pass through openings 21. As shown in FIG. 2, and shown more clearly in FIG. 7, the circumferentially-extending baffle can be provided around opening 21 by turning the metal of ring 13 to form a lip 22. It will be understood that the baffle 22 can be formed in other ways and with other shapes providing it cooperates with the wall 13 in the manner previously described. The height of the baffle means can vary, but will usually fall within the range from 1/8 inch to 3/8 inch, as measured from the inner surface of ring 13 to the inner end of lip 22. In some applications, the baffle can be omitted. When such baffle means is employed, however, it is preferred to have the baffle or lip around each of the openings 21, and to provide no non-baffled openings in the rings.

As shown in FIGS. 1 and 2, it is preferred to have the radially-spaced walls provided by rings 13 confined to a zone spaced outwardly from shaft 10, thereby leaving an annular space adjacent the shaft which is free of the contacting elements. In the illustration given, this annular space is divided into quadrants by four plates 23, which perform the function of anchor plates for securing the other components of the rotor 11 to shaft 10. Preferably, the innermost of the rings 13 is positioned outwardly from the central axis of shaft 10 by at least 20% of the rotor diameter.

Looking again at FIG. 1, it can be seen that rotor 11 includes two axially-spaced apart side plates 24 and 25. The concentric perforated rings 13 extend between the rings 24 and 25 and are supported thereby. The relationship between these parts is shown more clearly in FIGS. 2 and 5. The ends of the rings 13 are snugly received within grooves 26 which are formed on the inner walls of plates 24 and 25.

In the rotor assembly illustrated by the accompanying drawings, four anchor plates 23 are provided, as shown more clearly in FIG. 3. Other numbers of anchor plates can be used, such as three or six plates, providing the principle of symmetry is used, as required for an apparatus rotating at high speed. The anchor plates 23 extend along shaft 10 between side plates 24 and 25 and project outwardly toward rings 13. As shown more clearly in FIG. 3, the inner ends of anchor plates 23 are rigidly affixed to shaft 10. For example, this can be done by welding, as indicated in FIG. 3. With this construction, it is preferred to have side plates 24 and 25 detachably secured to the side portions of anchor plates 23, thereby permitting one or both side plates to be removed to obtain access to the interior of the rotor. In the illustration given, the side edges of plate 23 are drilled and tapped, as indicated in FIGS. 2 and 3. The side plates 24 and 25 are drilled with openings in alignment with the threaded holes 27 and 28, and attachment bolts 29 and 30 are respectively extended into openings 27 and 28, as shown more clearly in FIG. 2.

To assure correct positioning of the rotor 11 with respect to shaft 10, the shaft may be provided with a pair of keys 31 and 32, as shown in FIGS. 1 and 2. The side plates provide cooperating keyways, such as keyway 33 in plate 25, as seen in FIG. 4. Since the shaft in that view is sectioned behind the position of the key 32, the keyway is shown as empty, but it will be understood that the key 32 engages the keyway 33 when the parts are in assembled relation, as shown in FIG. 1.

With the construction described above, the shaft and anchor plates can provide communicating passages for introducing the liquid to be contacted into the interior of the rotor. However, other liquid feed means can be used. In the illustration given, shaft 10 provides an axially-extending passage 34 which connects with lateral passages 35, which in turn connect with the radially-extending passages 36 in the anchor plates 23. As shown in FIG. 1, shaft passage 34 communicates with a liquid inlet 37. After the liquid passes from shaft passage 34 through lateral passages 35, and anchor passages 36, the liquid enters distributor tubes 38 through an opening 39 therein, as seen in FIG. 2. Tubes 38 are received within axially extending bores 39 in the outer portions of plates 23. Side plate 25 provides openings 40 which are alignable with bores 39, as shown in FIG. 2. The outer portions of openings 40 are enlarged and threaded to receive retaining plugs 41.

The outer ends of anchor plates 23 are provided with a plurality of openings 42 which align with openings 43 and tubes 39, as shown in FIG. 2 and indicated in FIG.

3. It will be understood that tubes 39 should be indexed by suitable means, such as a pin and slot-type index, to assure the correct alignment of the openings 42 and 43. It will also be apparent that the openings in tubes 38 can be varied in size and location so as to utilize only part of the openings 42, or to restrict the flow through some of these openings.

As shown more clearly in FIG. 4, side plate 25 provides a plurality of gas discharge vents 44 through which the gas after passing inwardly through the contacting elements 13 is discharged to chamber 17 and thus passed to gas outlet 19. In the illustration given, the discharge vents 44 are quadrant-shaped, being formed in plate 25 between ribs 45 to which anchor plates 23 are connected. In the illustration given, the ribs 45 are integral with the rest of side plate 25 and connect to a hub portion 46 which is received on shaft 10, and provides the keyway 33. Preferably, the discharge vents 44 are located inwardly of the zone of the contacting elements, such as the rings 13. It is also preferred that the feed liquid is introduced into the rotor at points outwardly beyond the vents 44, although this is not highly critical since the feed liquid will be thrown radially outwardly due to the centrifugal force. In the event any of the liquid passes into chamber 17 through vents 44 or by other means, the chamber 17 can be provided with a valve-controlled liquid drain pipe 47. After passing outwardly through the rings 13, the liquid is discharged through openings 21a in an outer ring 13a, as shown in FIG. 5. It will be noted that the openings 21a are not provided with baffles, and therefore the liquid does not tend to accumulate on the inside surface of the ring 13a. As shown in FIGS. 1 and 5, the ends of plate 13a are received over the peripheral edges of side plates 24 and 25 and are detachably bolted thereto.

After being discharged from the rotor, the oil runs down the walls of chamber 16 and accumulates in a well or sump 48, as seen in FIG. 1. Sump 48 is provided with a standpipe 49 which maintains a liquid level in the sump. It will be understood that standpipe 49 is connected to a suitable discharge pipe, and that the discharge pipe is provided with a suitable valve. Drain pipe 47 connects to sump 48 above the level of standpipe 49.

It is preferred to construct vessel 14 as illustrated in FIG. 1 although other constructions can be used. In the embodiment shown, vessel 14 is formed of two parts, a larger part 14a on one side of partition 15 and enclosing rotor zone 16, and a smaller removable cover part 14b on the other side of partition 15 enclosing chamber 17. The meeting vessel parts can be provided with attachment means for forming a sealed connection therebetween. In the illustration given, as shown in FIGS. 1 and 8, the vessel parts 14a and 14b are respectively provided with annular flanges 50 and 51 which are clamped together by means of suitable bolts 52. As shown more clearly in FIG. 8, the outer peripheral portion of partition wall 15 extends between flanges 50 and 51, and gasket rings 52 and 53 are provided to assure a pressure-tight seal when the parts are clamped together. This construction also provides mechanical support for the partition means.

In order to provide a more complete separation between chambers 16 and 17 and to permit a slight pressure differential to be maintained between these chambers, it is preferred to provide a dynamic centrifugal liquid seal between partition 15 and rotor side plate 25. For example, in the illustration given an annular trough 55 is mounted on the outside of plate 25, as shown in FIGS. 1 and 9. The inner end portion of partition 15 is provided with a sealing ring 56 which has an outwardly extending portion 57 that extends into trough 55. Appropriate passage means is provided for supplying trough 55 with liquid during the operation of the apparatus. In the illustration given, a passage 58 extends through plate 25, as shown in FIG. 9. Passage 58 communicates with the liquid level maintained on the inside surface of one of the rings 13, as indicated in FIG. 9. It will be understood that a plurality of the bores 58 will be provided to assure that trough 55 is kept filled with the liquid during operation of the apparatus. The liquid will be held in the trough 55 by centrifugal force, and the ring 56 will cooperate therewith in providing a dynamic seal. To provide for a more positive feed of liquid to trough 55 where necessary, or if the baffles 22 are omitted from the ring 13, a liquid supply line 70 can be arranged to continuously or intermittently discharge into trough 55. For example, deodorized oil can be pumped through line 70 to provide the liquid seal. While the sealing arrangement described above is preferred, other types of seals can be used, such as close clearance seals or labyrinth seals.

It will be understood that the stationary casing or vessel 14 will be provided with a suitable external mounting to hold it rigidly during the operation of the apparatus. For example, vessel 14 can be mounted on a base support 59, as indicated in FIG. 1.

It will be understood that shaft 10 must be provided with suitable bearings, and with a liquid seal for introducing the liquid. In the illustration given, shaft 10 is supported by the walls of vessels 14. There is provided support and bearing assemblies 60 and 61 which include sleeve bearings 62 and 63 respectively. The assemblies also include thrust bearings 64 and 65. Seals 70 and 71 are also provided in combination with the bearing assemblies. To provide for lubrication of these bearings, during the deodorization of vegetable oils and fats, previously deodorized liquid triglycerides can be pumped to the bearings through lines 66 and 67. Any lubricant leaking past the bearings into either chamber 16 or 17, will not contaminate the material being processed. A drive connection 68 is provided in association with bearing mounting 65 and the drive shaft is mounted in a suitable bearing 69. It will be understood that shaft 68 will be connected to a suitable source of mechanical power for driving the shaft and rotor at speeds of 500 to 1,000 r.p.m. The seal and bearing arrangement illustrated in FIG. 1 is especially adapted for treating triglyceride oils. Where other liquids are being treated which have no lubricating properties, separate seals and bearings will be used, and other means provided for lubricating the bearings.

*Operation*

As previously indicated, the apparatus of this invention is particularly adapted for the deodorizing of triglyceride oils and fats, such as cotton seed oil, soybean oil, corn oil, lard, etc. In this application, the triglyceride material to be deodorized preferably after refining, drying and deaeration, is introduced to the rotor through inlet 37 and the connecting passages previously described. A rotor speed of 500 to 1000 r.p.m. can be used. This will create centrifugal force causing the triglyceride material discharged from tubes 38 to flow outwardly through the rings 13 within the rotor chamber. Where the ring openings 21 are provided with the baffles, as preferred, the triglyceride material will form layers on the inside of the rings, the level being maintained by the height of the baffles 22. Preferably, the triglyceride material is heated to substantially operating temperature before being introduced into the rotor (e.g. at a temperature of from 400 to 500° F.). In a preferred application, the triglyceride material is introduced at a temperature of from 450 to 500° F., and the rotor is also operated at a temperature within this range.

The interior of vessel 14 is maintained at a high vacuum by the connection of suitable vacuum equipment to steam outlet 19. For example, a three stage steam ejector can be used to create the desired vacuum. For deodorization, the applied vacuum will usually be within the range from 1 to 6 mm. Hg. The pressure within chamber 17 will be substantially the same as that applied through steam outlet 19, and the pressure in chamber 16 will be only slightly higher. For example, with steam ejectors creating a vacuum of 4 mm. Hg, the pressure within chamber 17 will be substantially 4 mm. Hg, while the pressure within chamber 16 will be only slightly higher (e.g. 6 mm. Hg). In other words, the total pressure drop from chamber 16 through rotor 11 to chamber 17 will not be over a few millimeters of mercury.

In the operation of the apparatus, steam is supplied to chamber 16 through inlet 18. The steam is preferably superheated, but saturated steam can also be used. The pressure and temperature of the steam will be regulated to obtain the desired operating temperature. It will be understood that the temperature and pressure of the incoming steam should be controlled to maintain the desired operating temperature within chamber 16. The quantity of steam relative to the triglyceride material can be relatively small. For example, from 0.015 to 0.03 lbs. of steam per pound of oil can be used.

Within the annular spaces between rings 13, the triglyceride material will be brought into intimate contact with the countercurrently flowing stream. The triglyceride material will be repeatedly dispersed in the steam atmosphere, thereby obtaining an intimate contact between the triglyceride material and the steam. The swirl and rotational turbulence of the layers of triglyceride material on the inside of the rings 13 will tend to form a froth or foam with the steam, which will be continously broken-up and reformed as the oil flows from ring to ring. This promotes effective contacting and leads to high stage efficiency. Since the contacting operation is carried out under the application of centrifugal force, the high contact efficiency is not obtained at the expense of oil loss by entrainment. As the stem moves inwardly toward shaft 10 carrying the volatile materials which have been removed from the oil or fat, any entrained droplets or particles of liquid triglyceride material are thrown outwardly by centrifugal force, and thus separated from the steam before it is discharged through vents 44 into chamber 17 and through steam outlet 19. This separating action is facilitated by providing the annular space around shaft 10 which is free from the contacting elements 13. In other words, this annular space acts as a separating zone, which tends to still further reduce entrainment loss.

Because of the high contacting efficiency, the residence time of the triglyceride material within the apparatus can be very short. Triglyceride material will therefore be exposed to the steam and high temperatures for a shorter period of time than with conventional deodorization apparatus, and this will tend to reduce the hydrolysis loss.

While in the foregoing specification this invention has been described in relation to a specific preferred embodiment thereof and many details have been set forth for purpose of illustration, it will be apparent to those skilled in the art that the invention is susceptible to other embodiments and that many of the details set forth herein can be varied considerably without departing from the basic constructional features of the apparatus. It will also be apparent that the apparatus can be used for many kinds of liquid-vapor contacting operations in addition to its use as a deodorizer. For example, it can be used for treating air with liquid treating agents, such as the cooling of air by contact with water, the drying of air by contact with a hygroscopic liquid, the sterilizing of air by contact with a bactericidal liquid, etc. Other applications include gas absorption processes for removal of contaminants from natural gas, such as the use of ethanolamine or an alkaline salt solution to remove $H_2S$ and $CO_2$, etc. In such applications, it will be understood that the construction and arrangement of the seals, bearings, inlets, etc. can be varied as required.

I claim:

1. In an apparatus for continuous countercurrent contacting of a liquid and a gas, said apparatus having a rotatably supported horizontally extending shaft, a cylindrical rotor mounted coaxially on said shaft for rotation therewith, said rotor including two axially spaced apart side plates, radially spaced apart concentric perforated rings extending between said side plates in a volume spaced outwardly from said shaft, said side plates supporting said rings, anchor plates extending along said shaft between said side plates and projecting outwardly toward said rings, the inner portions of said anchor plates being rigidly affixed to said shaft, said anchor plates having side portions and said side plates having means to detachably secure the side portions of said anchor plates to said side plates, said shaft and anchor plates providing communicating passages for introducing the liquid to be contacted into the interior of said rotor for outward flow through said rings, one of said side plates providing gas discharge vents inwardly of the zone of said rings between the side portions of said anchor plates, said vents providing for the discharge of gas after its inward passage through said rings.

2. The apparatus of claim 1 wherein said apparatus also includes a stationary casing surrounding and enclosing said rotor and the portion of said shaft on which said rotor is mounted, partition means dividing the interior of said casing into two spaces one of which contains said rotor, and means adjacent a sideplate of said rotor to provide a dynamic centrifugal liquid seal between said partition means and the adjacent side plate of said rotor, said seal being located on a circumferential line spaced outwardly from said shaft, said adjacent side having said openings therethrough communicating with the other of said spaces inwardly of said circumferential line.

3. The apparatus of claim 1 wherein said apparatus also includes a stationary casing surrounding and enclosing said rotor and the portion of said shaft on which said rotor is mounted, a partition member having an outer portion and dividing the interior of said casing into two spaces one of which contains said rotor, said vessel comprising two parts, a larger part providing one of said spaces around said rotor on one side of said partition member, and a smaller removable cover part providing the other of said spaces on the other side of said partition member, and releasable means securing said vessel parts together, the outer portion of said partition member being sealingly clamped between said vessel parts.

4. In a deodorizer apparatus for continuous countercurrent contacting of a triglyceride material with steam, said apparatus including a rotatably-mounted horizontally-extending shaft, and a cylindrical rotor mounted coaxially on said shaft for rotation therewith and providing a contacting chamber therein: a stationary pressure-tight vessel surrounding and enclosing said rotor and the portion of said shaft on which said rotor is mounted; partition means dividing the interior of said vessel into two spaces with said rotor being disposed within one of said spaces; steam inlet means for supplying steam to said one space for passage from the outer portion of one space to the inner portion thereof, said rotor comprising two axially spaced apart side plates, a plurality of radially spaced apart concentric perforated rings extending between said side plates in a zone spaced outwardly from said shaft within said one space, said side plates supporting said rings, and a plurality of circumferentially spaced anchor plates extending between said side plates adjacent said shaft, said anchor plates projecting outwardly from said shaft toward said concentric rings, the inner portions of said anchor plates being rigidly affixed to said shaft, said anchor plates having side portions and said side plates having means to detachably secure the side portions of said anchor plates to said side plates; said shaft and anchor plates providing communicating passages for introducing the triglyceride material to be deodorized into the interior of said rotor for outward flow through said rings; the side plate adjacent said partition means and said partition means having steam discharge openings therethrough, said openings being located inwardly of the zone of said rings and between the areas where said anchor plates are secured to said side plates, said openings providing for the discharge of steam which has been passed inwardly through said rings to the other of said spaces, steam outlet means for removing steam from said other space, and liquid outlet means for removing the deodorized triglyceride oil from the portion of said vessel extending beneath said one space.

5. The apparatus of claim 4 wherein there is also included means adjacent a side plate of said rotor to provide a dynamic centrifugal liquid seal between said partition means and the adjacent side of said rotor, said seal being located on a circumferential line outwardly of the said openings through said partition means.

References Cited by the Examiner
UNITED STATES PATENTS

| | | | |
|---|---|---|---|
| 2,111,133 | 3/1938 | Zwickl | 261—75 |
| 2,172,222 | 9/1939 | Pedbielniak | 261—83 |
| 2,281,616 | 5/1942 | Placek | 261—83 |
| 2,281,796 | 5/1942 | Pedbielniak | 261—83 |

HARRY B. THORNTON, *Primary Examiner.*

RONALD R. WEAVER, *Examiner.*